US012682339B1

(12) United States Patent　　　(10) Patent No.:　US 12,682,339 B1
Ezer et al.　　　　　　　　　　　　(45) Date of Patent:　　　Jul. 14, 2026

(54) TECHNIQUES FOR COSIGNING BLOCKCHAIN TRANSACTIONS

(71) Applicant: Blockaid LTD, Tel Aviv (IL)

(72) Inventors: Guy Ezer, Tel Aviv (IL); Ido Bennatan, Tel Aviv (IL); Raz Abraham Eliahou Niv, Savyon (IL)

(73) Assignee: Blockaid LTD, Tel Aviv (IL)

( * ) Notice: Subject to any disclaimer, the term of this patent is extended or adjusted under 35 U.S.C. 154(b) by 0 days.

(21) Appl. No.: 19/237,310

(22) Filed: Jun. 13, 2025

(51) Int. Cl.
　　*G06Q 20/36*　　　(2012.01)
　　*G06Q 20/38*　　　(2012.01)
　　*G06Q 20/40*　　　(2012.01)
(52) U.S. Cl.
　　CPC ....... *G06Q 20/3674* (2013.01); *G06Q 20/389* (2013.01); *G06Q 20/4016* (2013.01)
(58) Field of Classification Search
　　CPC ............. G06Q 20/3674; G06Q 20/389; G06Q 20/4016
　　See application file for complete search history.

(56) References Cited

U.S. PATENT DOCUMENTS

| | | |
|---|---|---|
| 10,277,631 B1 | 4/2019 | Gemeniano |
| 10,873,457 B1 | 12/2020 | Beaudoin et al. |
| 10,901,957 B2 | 1/2021 | Natarajan et al. |
| 10,972,279 B2 | 4/2021 | Sethi et al. |
| 11,734,533 B1 | 8/2023 | Cohen et al. |
| 11,797,697 B1 | 10/2023 | Holmes et al. |
| 2011/0055013 A1 | 3/2011 | Hammad |

| | | |
|---|---|---|
| 2011/0321139 A1 | 12/2011 | Jayaraman et al. |
| 2013/0098984 A1 | 4/2013 | Shenker et al. |
| 2014/0058937 A1 | 2/2014 | Watson |
| 2014/0165177 A1 | 6/2014 | Alagha et al. |
| 2016/0232353 A1 | 8/2016 | Gupta et al. |
| 2017/0346851 A1 | 11/2017 | Drake |
| 2018/0322286 A1 | 11/2018 | Diehl et al. |
| 2019/0386969 A1 | 12/2019 | Verzun et al. |
| 2020/0313856 A1 | 10/2020 | Basu et al. |
| 2020/0374133 A1 | 11/2020 | Liu et al. |

(Continued)

FOREIGN PATENT DOCUMENTS

| | | |
|---|---|---|
| CN | 110572398 A | 12/2019 |
| CN | 110602138 A | 12/2019 |
| CN | 111047319 A | 4/2020 |

OTHER PUBLICATIONS

Han et al., "An Efficient Multi-signature Wallet in Blockchain using Bloom Filter," Mar. 2021, ACM, p. 273-281 (Year: 2021).*

(Continued)

*Primary Examiner* — Jalatee Worjloh
(74) *Attorney, Agent, or Firm* — M&B IP Analysts, LLC

(57)　　　　　　ABSTRACT

A method and system for cosigning a blockchain transaction in a main multisignature (multisig) wallet is presented. The method includes selecting, by a cosigner executed in the main multisig wallet, a blockchain transaction, from a multiple signature (multisig) queue of a main multisig wallet; processing, by a security engine connected to the cosigner, the blockchain transaction through simulation and security validation to determine if the blockchain transaction is valid; signing, by the cosigner, the blockchain transaction when the blockchain transaction is determined to be valid; and withholding the blockchain transaction when the blockchain transaction is determined to be invalid.

25 Claims, 5 Drawing Sheets

(56)         References Cited

U.S. PATENT DOCUMENTS

| | | |
|---|---|---|
| 2021/0027325 A1 | 1/2021 | Lore et al. |
| 2021/0097528 A1 | 4/2021 | Wang |
| 2021/0314139 A1 | 10/2021 | Zhang et al. |
| 2022/0224532 A1 | 7/2022 | Bezzateev et al. |
| 2022/0237595 A1 | 7/2022 | Roach et al. |
| 2023/0230091 A1 | 7/2023 | Vaughn |
| 2023/0298002 A1 | 9/2023 | Moiyallah, Jr. et al. |
| 2025/0037115 A1* | 1/2025 | K .......................... G06Q 20/401 |

OTHER PUBLICATIONS

Karolina. (Oct. 9, 2023). How to create a MultiSig wallet using gnosis SAFE—tutorial. Nextrope—Your Trusted Partner for Blockchain Development and Advisory Services; Nextrope. https://nextrope.com/how-to-create-a-multisig-wallet-using-gnosis-safe-tutorial/.

* cited by examiner

TECHNIQUES FOR COSIGNING BLOCKCHAIN TRANSACTIONS

RELATED SUBJECT MATTER

This application relates to the subject matter of U.S. Pat. No. 11,930,043, entitled "Techniques for Digital Wallet Integration and for Scanning Transactions Using Integrated Modules," filed Sep. 8, 2023, which is incorporated herein by reference in its entirety.

TECHNICAL FIELD

The present disclosure relates generally to digital wallets such as wallets used for accessing blockchains, and more specifically to integrating with digital wallets to co-sign blockchain transactions.

BACKGROUND

Uses of blockchain technology have been on the rise in recent years. One particular development that came about due to the advent of blockchains is the use of blockchain as one of the building blocks for the next generation of the Internet, commonly referred to as Web 3.0. More specifically, blockchains are decentralized electronic ledgers built upon a network of peer-to-peer nodes. Each peer node in a blockchain network stores a copy of the blockchain, such that the blockchain is not stored in only a single centralized storage. The decentralized nature of the blockchain, in combination with procedures used for validating and recording transactions, ensures that the ledger cannot be unilaterally edited by a single node. This provides reliability for the data stored on the blockchain. However, blockchain transactions are prone to cyber-attacks, mainly trying to steal assets stored in crypto wallets.

Blind signing is the act of approving a digital transaction, typically with a hardware or software wallet, without fully understanding or verifying its contents. This happens when the signer cannot clearly see what the transaction will actually do, often due to the following actions: the user interface (UI) displays misleading or incomplete information, the transaction details are too complex to be easily interpreted, and the wallet or interface is compromised, showing a fake or altered summary of the transaction.

In these cases, the signer is essentially "blind" to the real effects of what they are authorizing, such as transferring funds to an attacker or giving up control of a smart contract. Blind signing is especially dangerous in crypto environments because transactions are irreversible once broadcast to the blockchain.

Blind signing attacks bypass all conventional defenses and exploit human and system trust assumptions. Without automatic, execution-level validation, even secure environments (using multisig or hardware wallets) are vulnerable. Major incidents like those involving Bybit, Radiant Capital, and WazirX demonstrate the failure of current Web3 security stacks to prevent such multi-layered, deceptive exploits.

Solutions that enable new ways of securing digital wallets against potential cyber threats are therefore highly desirable.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, the method may include selecting, by a cosigner executed in the main multisig wallet, a blockchain transaction, from a multiple signature (multisig) queue of a main multisig wallet. The method may also include processing, by a security engine connected to the cosigner, the blockchain transaction through simulation and security validation to determine if the blockchain transaction is valid. The method may furthermore include signing, by the cosigner, the blockchain transaction when the blockchain transaction is determined to be valid; and withholding the blockchain transaction when the blockchain transaction is determined to be invalid. Other embodiments of this aspect include corresponding computer systems, apparatus, and computer programs recorded on one or more computer storage devices, each configured to perform the actions of the methods.

Implementations may include one or more of the following features. The method may include: signing the withheld blockchain transaction when approved by a user.

The method may include: signing, by an independent signer operated under the control of the cosigner, the blockchain transaction only after the blockchain transaction has been simulated and validated by the security engine; and signing, by a dependent signer operated under the control of the cosigner, the blockchain transaction only after the withheld blockchain transaction has been approved by the user.

The method may include: configuring the cosigner as a dedicated wallet in the main multisig wallet in a 1-2 threshold configuration.

The method may include: configuring the cosigner as a signer in the main multisig wallet, where the cosigner is addressed as a single signer on the blockchain, and where the cosigner is configured as any one of: an additional signer and a required signer.

The method may include: signing, by an independent signer operated under the control of the cosigner, the blockchain transaction only after the blockchain transaction has been simulated and validated by the security engine; and signing, by a dependent signer operated under the control of the cosigner, the blockchain transaction only after the withheld blockchain transaction has been approved by the a user, where the each of the independent signer and the dependent signer is on an isolated signing path addressed by the a cosigner's address on the blockchain.

The method may include: signing, by the main multisig wallet, the blockchain transaction only when signed by the cosigned configured as the required signer. The method may include: counting, by the main multisig wallet, the blockchain transaction towards a threshold for a quorum when only when signed by the cosigned configured as an additional signer.

The method may include: performing off-chain simulation to validate the blockchain transaction, where the off-chain simulation includes heuristic and behavioral analysis, threat intelligence test, and validating the transaction against a set of rules.

The method may include: performing static and dynamic code analysis on the transactions to identify potential threats.

The method may include: validating the blockchain transaction against a set of malicious websites configured with a security engine. The method where the main multisignature (multisig) wallet is any one of: a standard cryptocurrency wallet and a multi-party computation (MPC) cryptocurrency wallet. Implementations of the described techniques may include hardware, a method or process, or a computer-tangible medium.

In one general aspect, a non-transitory computer-readable medium may include one or more instructions that, when executed by one or more processing circuitries of a device, cause the device to: select, by a cosigner executed in the main multisig wallet, a blockchain transaction, from the a multiple signature (multisig) queue of a main multisig wallet; process, by a security engine connected to the cosigner, the blockchain transaction through simulation and security validation to determine if the blockchain transaction is valid; sign, by the cosigner, the blockchain transaction when the blockchain transaction is determined to be valid; and withhold the blockchain transaction when the blockchain transaction is determined to be invalid. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: select, by a cosigner executed in the main multisig wallet, a blockchain transaction, from the multiple signature (multisig) queue of a main multisig wallet.

The system may, in addition, process, by a security engine connected to the cosigner, the blockchain transaction through simulation and security validation to determine if the blockchain transaction is valid.

The system may moreover sign, by the cosigner, the blockchain transaction when the blockchain transaction is determined to be valid. The system may also withhold the blockchain transaction when the blockchain transaction is determined to be invalid. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: sign the withheld blockchain transaction when approved by a user. The system where the memory contains further instructions which when executed by the processing circuitry further configure the system to: sign, by an independent signer operated under the control of the cosigner, the blockchain transaction only after the blockchain transaction has been simulated and validated by the security engine; and sign, by a dependent signer operated under the control of the cosigner, the blockchain transaction only after the withheld blockchain transaction has been approved by the user.

The system where the memory contains further instructions which when executed by the processing circuitry further configure the system to: configurate the cosigner as a dedicated wallet in the main multisig wallet in a 1-2 threshold configuration.

The system where the memory contains further instructions which when executed by the processing circuitry further configure the system to: configure the cosigner as a signer in the main multisig wallet, where the cosigner is addressed as a single signer on the blockchain, and where the cosigner is configured as any one of: an additional signer and a required signer.

The system where the memory contains further instructions which when executed by the processing circuitry further configure the system to: sign, by an independent signer operated under the control of the cosigner, the blockchain transaction only after the blockchain transaction has been simulated and validated by the security engine; and sign, by a dependent signer operated under the control of the cosigner, the blockchain transaction only after the withheld blockchain transaction has been approved by the a user, where the each of the independent signer and the dependent signer is on an isolated signing path addressed by the a cosigner's address on the blockchain.

The system where the memory contains further instructions which when executed by the processing circuitry further configure the system to: sign, by the main multisig wallet, the blockchain transaction only when signed by the cosigned configured as the required signer. The system where the memory contains further instructions which when executed by the processing circuitry further configure the system to: count, by the main multisig wallet, the blockchain transaction towards a threshold for a quorum when only when signed by the cosigned configured as an additional signer.

The system where the memory contains further instructions which when executed by the processing circuitry further configure the system to: perform off-chain simulation to validate the blockchain transaction, where the off-chain simulation includes heuristic and behavioral analysis, threat intelligence test, and validating the transaction against a set of rules.

The system where the memory contains further instructions which when executed by the processing circuitry further configure the system to: perform static and dynamic code analysis on the transactions to identify potential threats.

The system where the memory contains further instructions which when executed by the processing circuitry further configure the system to: validate the blockchain transaction against a set of malicious websites configured with a security engine.

The system where the main multisignature (multisig) wallet is any one of: a standard cryptocurrency wallet and a multi-party computation (MPC) cryptocurrency wallet. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The disclosed embodiments include techniques for operating as an additional signer ("cosigner") within a multisignature (multisig) wallet configuration. The multisig wallet may include, for example, a standard cryptocurrency wallet (with a local private key) or a multi-party computation (MPC) cryptocurrency wallet (with a distributed private key). In an embodiment, the cosigner is configured to approve only those transactions that have been successfully simulated and validated against predefined organizational security and compliance policies. Each transaction submitted for approval is automatically subjected to an analysis process, which may include execution within a simulation environment and evaluation by a threat detection engine. In an embodiment, the cosigner is implemented using standardized multisig infrastructure and may be deployed as a signer compatible, for example, with Safe or similar wallet frameworks. The disclosed cosigner operates entirely within the native transaction and approval architecture of the underlying blockchain network, and does not require any proprietary execution environment or off-chain component for enforcement or validation.

Figure 1:
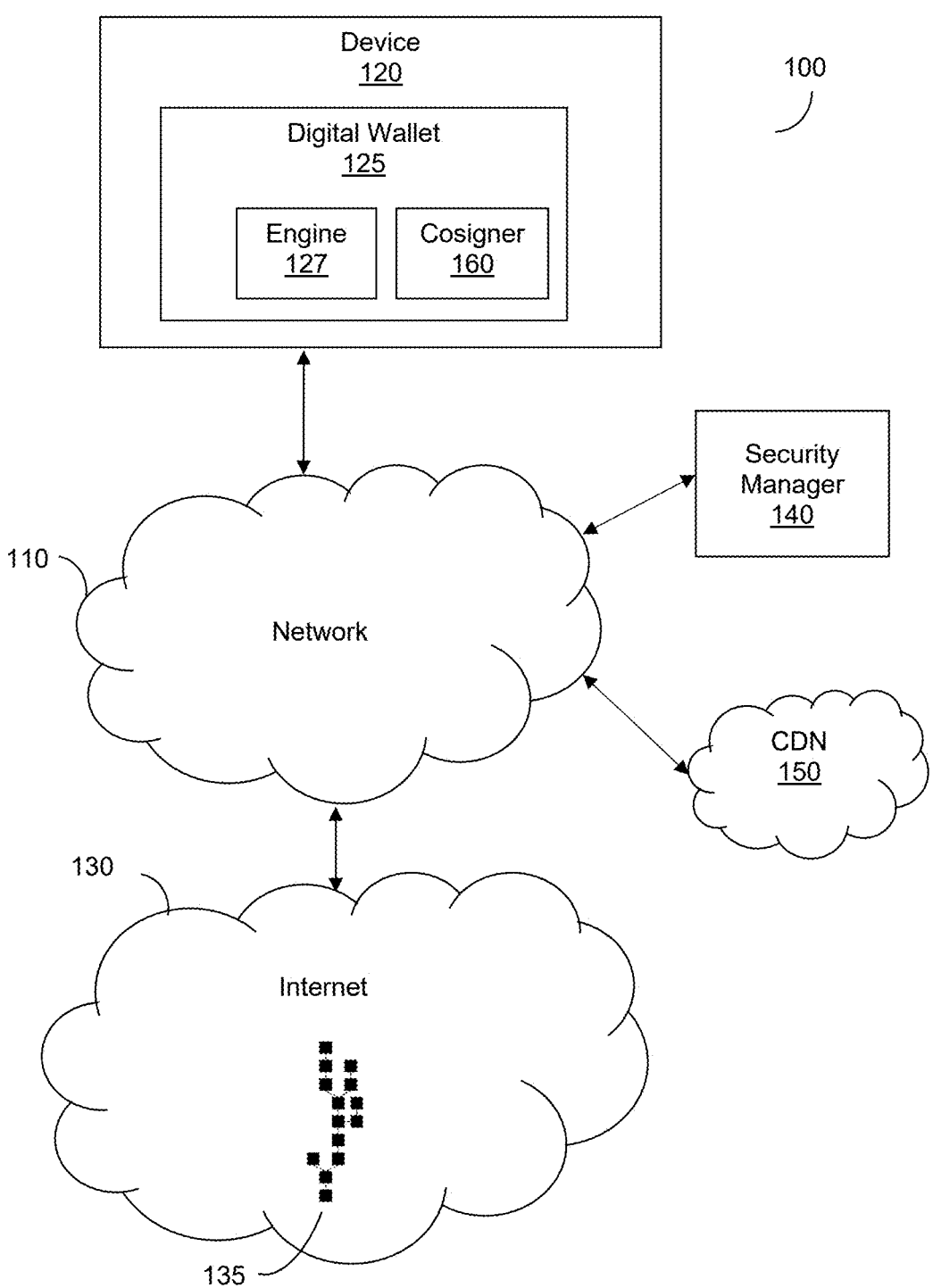
FIG. 1 is a network diagram utilized to describe various disclosed embodiments.

FIG. 1 shows an example network diagram 100 utilized to describe the various disclosed embodiments. In the example network diagram 100, a device 120, the Internet 130, a security manager 140, and a content delivery network (CDN) 150 communicate via one or more networks 110.

The networks 110 may be, but are not limited to, any of or a portion of a wireless, cellular or wired network, a local area network (LAN), a wide area network (WAN), a metro area network (MAN), the Internet, the worldwide web (WWW), similar networks, and any combination thereof.

The device 120 may be, but is not limited to, a personal computer, a laptop, a tablet computer, a smartphone, a wearable computing device, a server, or any other device capable of accessing websites running as decentralized applications (dApps) pursuant to the Web 3.0 model.

To this end, the device 120 is equipped with (as shown) or is communicatively connected to (not shown) a digital wallet 125. A digital wallet, also referred to as a wallet a crypto wallet, is a computer program or device utilized to access assets held by a user via a decentralized ledger such as a blockchain. The digital wallet 125 is configured to access one or more decentralized networks (not shown) and, in particular, to access a distributed electronic ledger such as the distributed electronic ledger 135 of the Internet 130. The digital wallet 125 may store data such as, but not limited to, data used to access distributed electronic ledgers (e.g., access credentials), data indicating assets of an account associated with the digital wallet 125 whose ownership is recorded on one or more distributed electronic ledgers (e.g., values indicating amounts of cryptocurrency or data of digital assets such as non-fungible tokens), both, and the like.

In one configuration, the digital wallet 125 is a multisig wallet. A multisig wallet (short for multi-signature wallet) in the context of cryptocurrency is a type of digital wallet that requires multiple private keys to authorize a transaction, rather than just one. This design adds an additional layer of security and control over how funds are accessed or transferred. Such wallets are developed and maintained by companies, including, for example, Gnosis Safe (Now: Safe), Casa, BitGo, Squads, Fireblocks, and the like.

The digital wallet 125, acting as a multisig wallet, may utilize an encryption key stored in one location. Alternatively, digital wallet 125, acting as a multisig wallet, is based on a multi-party computation (MPC) that distributes the control of private keys among multiple parties using advanced cryptographic techniques. Typically, MPC wallets split this key into multiple "shares," each held by different parties. These parties collaboratively authorize transactions without ever reconstructing the full private key, thereby eliminating single points of failure and enhancing security.

In accordance with various disclosed embodiments, the device 120 further has a security module or engine 127 installed thereon. The engine 127 is configured to perform at least a portion of the disclosed embodiments related to transaction analysis and transaction security activities. To this end, the engine 127 may be installed as an extension on the digital wallet 125 or otherwise implemented in the digital wallet 125. In some configurations, the engine 127 is configured to send transactions to a cosigner 160.

In an example implementation, the engine 127 may be realized at least partially as a binary large object (blob). Such a blob is a collection of binary data stored as a single entity, for example, in a database management system. In such embodiments, each blob may include a collection of data on existing websites (e.g., website data created or collected by the security manager 140, instructions for performing functions of the engine, or both.

In some implementations, the device 120 may be a user device owned or operated by a person who may access Web 3.0 websites. In such implementations, the digital wallet 125 may be a personal digital wallet of the user and may include the user's personal (crypto) assets. Further, in such implementations, the engine 127 may be realized as an agent installed on the device 120.

In another implementation, the device 120 may be a server or other system owned or operated by an entity using Web 3.0 websites in order to realize or otherwise in order to provide their services. In such cases, the digital wallet 125 may be an organization's digital wallet of the entity operating the device 120 and may include business assets or other assets that may be utilized for the organization's services (e.g., cryptocurrency utilized to purchase services consumed by the device 120).

The Internet 130 is an interconnected network which is at least partially designed according to the Web 3.0 model in which websites are realized as decentralized applications (dApps) hosted across a plurality of nodes (not separately depicted in FIG. 1) of a decentralized network (e.g., the Internet 130 or a subset thereof). To this end, the Internet 130 is implemented via one or more distributed electronic ledgers 135. Each distributed electronic ledger 135 may be, but is not limited to, a blockchain or other ledger distributed across multiple nodes.

As noted above, such decentralized applications may need to be secured against potential cyber threats. In particular, it has been identified that attackers attempting to exploit vulnerabilities in dApps may attempt to identify users by intercepting wallet calls, so malicious websites may be implemented by attackers as dApps in order to gain access to wallet calls for their malicious purposes. The disclosed embodiments provide techniques for co-signing transactions to block any potentially malicious behavior.

The security manager 140 is also configured to manage the engine 127 as well as any other modules utilizing existing website data. To this end, the security manager 140 may further be configured to push data (e.g., website data, computer instructions, etc.) to the device 120. The security manager 140 may receive requests to scan websites and to determine if those websites are malicious or potentially malicious. Blobs to be deployed as the engine 127 and integrated with the digital wallet 125 may be created by the security manager 140 using the results of such scans, such as, but not limited to, the existence of discovered websites, whether each website was determined to be malicious or not, both, and the like.

A security manager 140 is configured to manage the engine 127 as well as any other engines (not shown) utilizing existing website data. To this end, the security manager 140 may be a server or other system configured to push data (e.g., website data, computer instructions, etc.) to the device 120. In some implementations, the security manager 140 may be further configured to receive data about new websites from the device 120 or from other devices (not shown). Blobs to be deployed as the engine 127 and integrated with the wallet 125 may be received by the security manager 140 using the results of previous scans performed by the security manager 140 may be acting as a web scanner or received from an external web scanner (not shown) such as, but not limited to, the existence of discovered websites, whether each website was determined to be malicious or not, both, and the like. Such results of previous scans may be utilized by the modules in order to determine if calls are being received from malicious dApps, and therefore, the wallet should be protected from those calls (e.g., by preventing those calls from being received by the wallet).

The security manager 140 may be configured, upon scanning websites, to periodically, continuously, or otherwise repeatedly push new data to the device 120, for example, data including newly discovered websites. To this end, in some embodiments, security manager 140 may be configured to create new blobs and to push new blobs to the device 120, for example, periodically. The new blobs or other data from the security manager 140 may be sent to the device 120 via one or more networks such as, but not limited to, a CDN 150.

In one configuration, the engine 127 may include at least two kinds of memory segments, i.e., kinds of data which are utilized to execute the module: code and data. Each memory segment may be updated through differential (diff) functions, thereby minimizing the network usage needed to deploy updated data on the device 120. Such diffs may include, but are not limited to, additions of data and code, and may further include subtractions of portions of data or code which are no longer to be used with the engine 127. More specifically, for such a subtraction, previously identified threats (e.g., previously detected malicious websites) may be excluded from data pushed to the device 120, thereby removing old threats from the data to be transmitted.

According to the disclosed embodiments, a cosigner 160 is configured to prevent signing attacks, specifically blind signing attacks. Such attacks bypass all conventional defenses and exploit human and system trust assumptions. Without automatic, execution-level validation, even secure environments (using multisig or hardware wallets) are vulnerable. Major incidents demonstrate the failure of current Web3 security stacks to prevent such multi-layered, deceptive exploits.

The cosigner 160 is configured to mitigate other risks or threats by acting as a policy-enforcing, security-aware signer that reviews each transaction before it can be approved. Such threats include compromised signers (when a device is compromised, attackers can push malicious transactions through the multisig); Social engineering and spoofed UIs (where attackers trick signers into approving harmful transactions); supply chain risks (where third-party libraries or wallet dependencies may introduce vulnerabilities); and human error (where Mistakes by operational teams or attacks that target the human-in-the-loop, e.g., address poisoning).

The disclosed cosigner 160 addresses these issues by adding an independent, policy-driven, and interface-agnostic validator to the signing process. Cosigner 160 is a real-time, automated, independent verification module designed to protect Web 3.0 organizations from blind signing attacks. The cosigner 160 functions as a final security checkpoint in the transaction approval process within multisig wallets, such as wallet 125.

In an embodiment, the cosigner 160 is integrated directly into the existing infrastructure of the wallet 125 as an additional signer. The wallet's 125 signing logic is unchanged as the cosigner 160 is added as one of the required participants in a multisig quorum (e.g., 2 of 3). When the cosigner 160 is added to the wallet 125, it acts as a policy enforcement mechanism. That is, the cosigner 160 only signs transactions that pass threat detection and policy validation.

To this end, in an embodiment, when a transaction is submitted to a (multisig) wallet 125, the cosigner 160 receives the transaction details and simulates the transaction off-chain. The off-chain simulation includes performing heuristic and behavioral analysis, threat intelligence test, and validating the transaction against a set of rules defined, for example, by the organization. In an embodiment, part of the off-chain simulation's tests are performed by the engine 127 under the control of the security manager 140.

The operation of the engine 127 is further described in one or more modules disclosed in U.S. Pat. No. 11,930,043, entitled "TECHNIQUES FOR DIGITAL WALLET INTEGRATION AND FOR SCANNING TRANSACTIONS USING INTEGRATED MODULES," which is incorporated herein by reference in its entirety. The referenced application is assigned to the same assignee as the present application and provides additional technical detail concerning specific components and functionalities relevant to engine 127.

In an embodiment, if the transaction is safe, the cosigner 160 signs the transaction. It should be noted that the cosigner 160 submits its signature automatically upon determination that the transaction is safe. This speeds up the quorum formation and offers reassurance to other human signers. The signature (signed transaction) is sent together with the transaction's details. A transaction typically includes the following details: sender address, recipient address, amount transferred, transaction fee (gas fee), nonce, digital signature, timestamp, and transaction hash (TXID). Depending on the blockchain, it may also include smart contract data (e.g., Ethereum), UTXOs (e.g., Bitcoin), or program instructions (e.g., Solana), along with optional metadata like memos or notes.

If the transaction is flagged as unsafe, the cosigner 160 withholds its signature unless an override is explicitly triggered by a user of the organization. In an embodiment, an alert is generated for each unsafe transaction. In an embodiment, any unsafe transaction is logged with detailed context on the threat (e.g., recipient address flagged in phishing campaigns).

It should be appreciated that the result is an automated, policy-driven safeguard, as executed by the cosigner 160, ensures transactions are reviewed before being approved on-chain.

It should be noted that FIG. 1 depicts the Internet merely for example purposes, but that the disclosed embodiments may be equally applied to other portions of the Internet or other networks.

Figure 2:
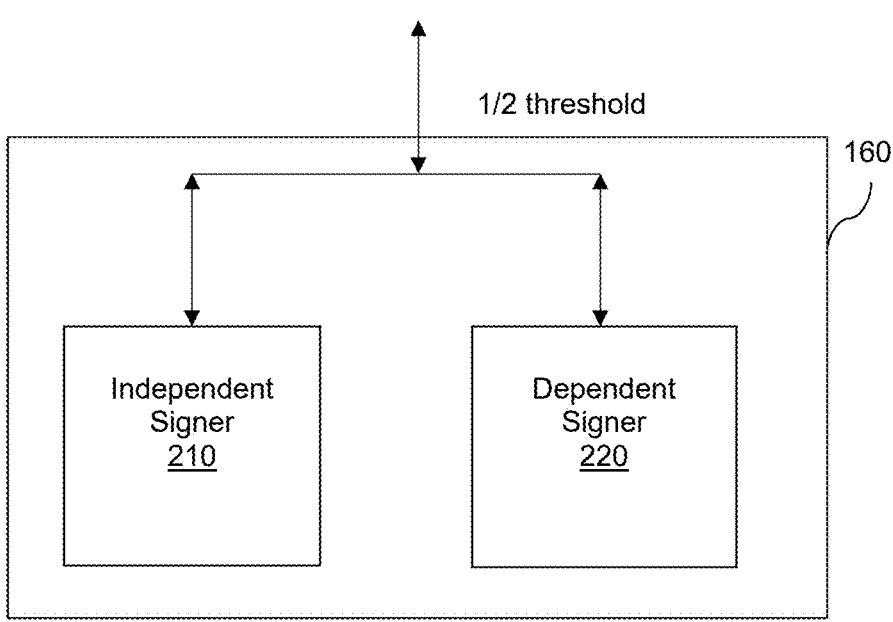
FIG. 2 is a logical diagram of a cosigner according to an embodiment.

FIG. 2 illustrates the functional diagram of the cosigner 160 according to one embodiment. The cosigner 160 functions as a single signer within a main digital multisig wallet ("main wallet) having key(s) in one location. However, it should be emphasized that the disclosed embodiments can operate with an MCP configuration of the wallet.

In an embodiment, the cosigner 160 operates as a dedicated wallet, with a 1-2 threshold, responsible for generating the actual signature required for the approval process of the main wallet. This structure enables the cosigner 160 to facilitate both automated validation and manual override, while ensuring a clear separation of control between an independent signing authority and the organization. The threshold of the cosigner 160 may be reconfigured.

As shown in FIG. 2, the cosigner 160 includes two signing components: an independent signer 210 and a dependent signer 220. The independent signer 210 is external to the organization managing the wallet, while the dependent signer 220 is managed by the organization.

In an embodiment, the independent signer 210 is configured to automate the approvals of transactions by signing transactions only after they have been simulated and validated by the security engine. The private key of the independent signer 210 cannot be utilized to access funds, and cannot be used manually or programmatically outside of the validation pipeline.

The dependent signer 220 is designed to allow manual overrides of approval or disapproval decisions made by the independent signer 210. The dependent signer 220 serves as a fallback option for operational edge cases, false positives, or urgent manual workflows. In one configuration, since this signer can bypass the cosigner security layer, it is managed out-of-band in a secure, offline manner.

It should be noted that one of the signers, 210 or 220, is needed to fulfill the 1-of-2 threshold of the cosigner 160.

Figure 3:
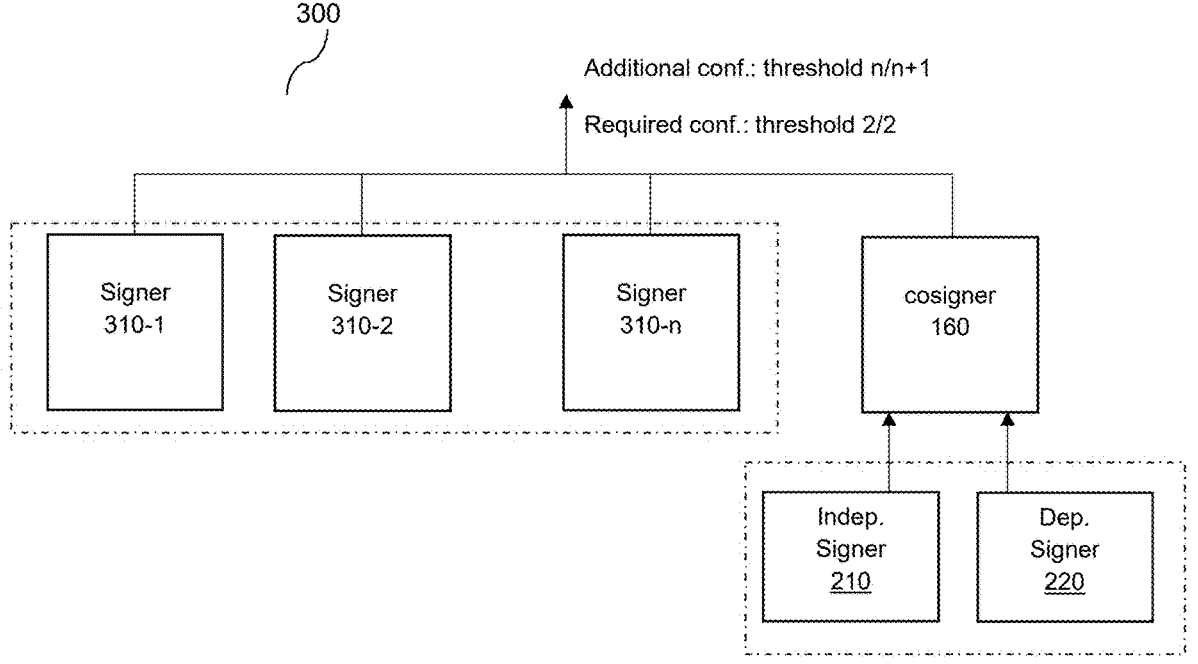
FIG. 3 is a logical diagram of a cosigner integrated in a multisig wallet according to an embodiment.

FIG. 3 shows an example embodiment for integrating the cosigner 160 into a digital main wallet ("main wallet") 300 according to an embodiment. In this embodiment, the main wallet is a multisig wallet. However, it should be emphasized that the disclosed embodiments can operate with an MCP wallet as well.

In an example embodiment, the cosigner 160 is added as a signer to the main wallet 300. The main wallet 300 holds the assets and executes transactions. When a transaction is approved by the cosigner 160, the cosigner 160 produces a signature that is submitted to the main wallet 300. It should be noted that the signature can be produced by either the independent signer 210 or a dependent signer 220, as discussed above.

It should be noted, regardless of the signer (210 or 220), that the signatures provided, the address of cosigner 160 (not the signers' individual keys), appear in the main wallet's 300 signer set. This abstraction allows the main wallet 300 to treat cosigner 160 as a single signer, while internal signature decisions are routed through two independent, isolated paths: independent signer 210 and a dependent signer 220.

In an embodiment, cosigner 160 is added to the main wallet 300 just like any other signer, e.g., signers 310-1, 310-2, or 310-$n$ ('n' is an integer equal to or greater than). The cosigner 160 is assigned a single address that represents it on-chain. It should be noted that, unlike a typical signer, the cosigner's 160 address is back with two isolated signing paths by the independent signer 210 and the dependent signer 220.

It should be noted that from the perspective of the main wallet 300 (or any other on-chain system), the cosigner 160 is a single signer address. The cosigner 160 participates in signing flows like any other signer. The signature appears on-chain and is verifiable. It should be noted that there is no exposure to the internal dual-signer logic.

This design keeps the cosigner's 160 complexity abstracted from the main wallet's 300 infrastructure, while preserving auditability and full control of the transactions' approval process.

In an embodiment, the cosigner 160 can operate in two configurations: an additional signer and a required signer. At the additional signer configuration, the cosigner 160 is added as an additional signer. In such a configuration, the cosigner's 160 signature contributes to the quorum but is not required. That is, the rest of the signers (310) reach the threshold without cosigner 160, the transaction can still be executed, even if the cosigner 160 withheld its signature.

In the required signer configuration, the cosigner 160 is one of the required signers. If the cosigner 160 does not sign the transaction, the transaction cannot be executed, regardless of other signers' 310 approvals. It should be noted that the preferred configuration can be set with the main wallet's 300 signer configuration. Internally, the cosigner 160 operates the same regardless of the selected configuration.

Figure 4:
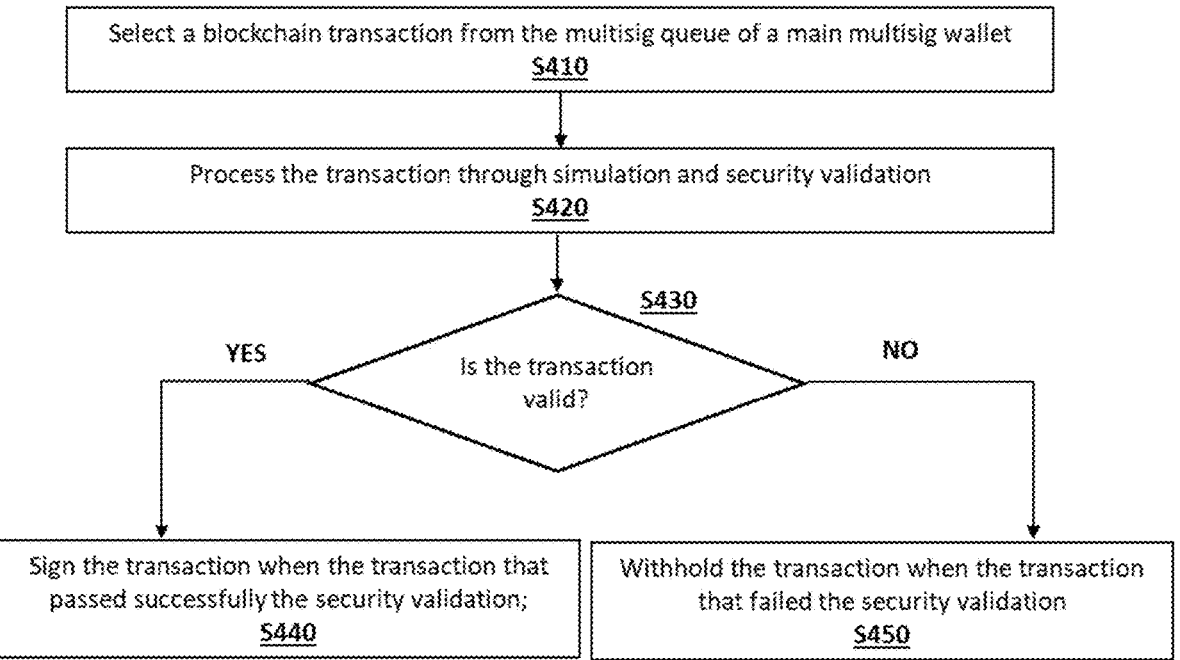
FIG. 4 is a flowchart illustrating a method for wallet integration and cosigning a transaction according to an embodiment.

The architecture depicted in FIGS. 3 and 4 provide several advantages in accordance with certain embodiments. First, the attack surface remains unchanged. Because the cosigner 160 utilizes multisignature (multisig) contracts, no additional third-party contracts are introduced into the security model. As a result, the disclosed embodiments maintain the same level of exposure to external threats as prior implementations, thereby preserving the integrity of the original attack surface.

Second, the architecture of the cosigner 160 eliminates any single point of failure. Specifically, the cosigner 160 is configured such that it cannot execute a signature operation without successful validation, unless an override is manually authorized by the organization. This configuration enhances operational resilience and enforces validation checks as a prerequisite for execution.

Third, deterministic control is achieved. The cosigner's 160 address associated with the main wallet 300 exhibits predictable behavior. That is, the cosigner 160 proceeds to sign transactions if and only if at least one of the two internal keys authorizes the transaction. This deterministic condition enhances transparency and auditability within the transaction approval process.

Fourth, the disclosed embodiment offers fail-safe flexibility. In circumstances where a transaction is flagged by internal validation logic but is determined to be operationally necessary, the organization retains the capability to authorize the transaction manually through the use of an override key. This feature ensures that critical operations are not obstructed due to overly conservative validation outcomes.

FIG. 4 is a flowchart of an example process 400. In some implementations, one or more process blocks of FIG. 4 may be performed by a device executing a cryptocurrency wallet. The device may include specialized hardware components configured to perform cryptographic operations, such as secure enclaves or hardware security modules (HSMs), which may be utilized to ensure secure storage and handling of private keys. Additionally, the device may operate within a constrained execution environment, such as a trusted execution environment (TEE), to prevent unauthorized access to transaction-related data. In some implementations, the device may also be configured to generate cryptographic attestations or secure logs for auditing and verification of transaction handling. The disclosed embodiments enhance the security and integrity of the transaction processing system and may be utilized with blockchain networks such as Ethereum, Bitcoin, Solana, Avalanche, and the like.

At S410, a blockchain transaction is selected from the multisig queue of a main multisig wallet. In certain embodiments, the multisig queue may be implemented as a priority queue or a timestamp-based ledger. The queue may be stored in a tamper-evident structure, such as a Merkle tree or append-only log, to support integrity verification. In an embodiment, dynamic transaction selection policies are enforced. Such policies determine that the selection may be based on network conditions or wallet activity thresholds, thereby optimizing transaction throughput and minimizing exposure to denial-of-service conditions.

At S420, transactions are processed through simulation and security validation. In some implementations, the simulation may execute the transaction logic in a sandbox or emulator that replicates the target blockchain state, allowing for predictive analysis of transaction effects. Security validation may include both static and dynamic code analysis to identify potential threats to stealing assets by means of direct actions, such as access control failures, gas exhaustion, or arithmetic errors. In one embodiment, the validation function may consult threat intelligence databases or machine-learned anomaly detection models to assign a risk score to the transaction. The simulation and validation outputs may be cryptographically signed and retained for audit or compliance review.

In a further embodiment, a validation function is designed to receive an RPC method (e.g., a JSON-RPC method) and to return a result indicating whether the received RPC method is malicious. In some implementations, the exported validation function may further express whether the RPC method is malicious with increased granularity, for example, whether the method is benign, potentially malicious, or malicious. The exported validation function may also return a notification including an explanation of the results of its validation. The validation function may be defined with respect to one or more malicious call determination rules, which in turn may be utilized to determine whether a call (and, accordingly, the website that transmitted the call) is malicious or potentially malicious. Further, the malicious call determination rules may be defined with respect to known malicious or otherwise anomalous call behavioral data, which may be pushed as part of blobs updating the engine (127, FIG. 1) (for example, periodically) to update such data and allow for detection of new indicators of malicious calls as those new indicators are identified.

In a further embodiment, a simulation function is provided to simulate a transaction function and a raw simulated transaction function. The simulate transaction function is designed to obtain a transaction and to return a full simulation of the transferred assets indicated in the transaction, as well as the potential exposure and ownership transfers of the transaction. The raw simulate transaction function may obtain a transaction and return a full simulation for the transaction like the simulate transaction function, but for a raw byte string transaction. The simulation function may be further designed or programmed to simulate opcodes of calls, to parse changes, and to determine technical information related to user experience used for realistic simulations, such as asset differentials, exposure differentials, events, and the like.

In a further embodiment, S420 includes validating the transaction against a set of malicious websites configured with a security engine (e.g., engine 127, FIG. 1).

At S430, it is checked whether the transaction passes the security validation. If so, at S440, the transaction is signed. Signing may be performed using the cosigner 160. As noted above, in an embodiment, the cosigner 160 is implemented as another signer in a main multisig wallet. As such, the final authorization of the transaction is based on a threshold cryptography protocol, where a quorum of signers have to approve the transaction prior to signature aggregation If S430 results in a No answer, i.e., when the transaction fails the security validation, at S450, the transaction is withheld. In an embodiment, transactions withheld from execution may be flagged for manual review and approval in a secure, non-executable format.

Figure 5:
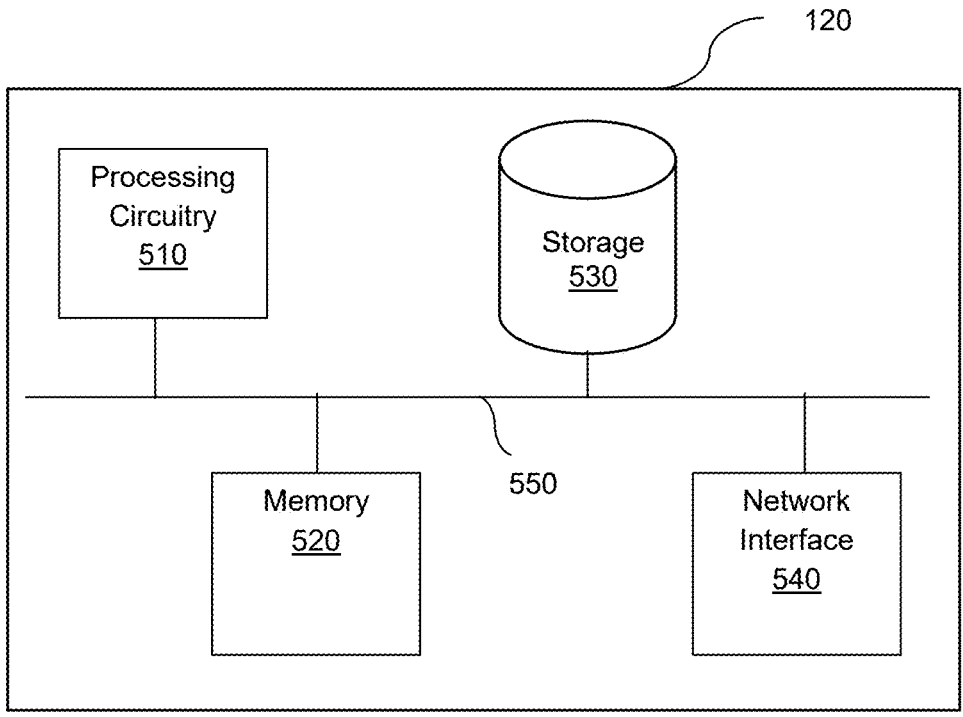
FIG. 5 is a schematic diagram of a hardware layer of a system that may be utilized in accordance with various disclosed embodiments.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. For instance, transaction simulation and security validation may be conducted concurrently on multiple independent transactions. Transactions, as discussed herein above, are blockchain transactions FIG. 5 is an example schematic diagram of a hardware layer 500, which may be utilized in accordance with the disclosed embodiments. As a non-limiting example, the device 120 and any of its components (e.g., the digital wallet 125, the engine 127, and cosigner 160).

The hardware layer 500 includes a processing circuitry 510 coupled to a memory 520, a storage 530, and a network interface 540. In an embodiment, the components of hardware layer 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), either alone or in combination, and the like, or any other hardware logic components that can perform calculations or other manipulations of information. Processing circuitry 510 may be configured to execute artificial intelligence (AI) and/or machine learning (ML) models. Further, processing circuitry 510 may be adapted to perform tasks such as inference, training, data pre-processing, and real-time decision-making in support of AI/ML-based operations.

The memory 520 may be volatile (e.g., random access memory, etc.), non-volatile (e.g., read-only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the hardware layer 500 to communicate with, for example, the decentralized network, the security manager 140, the CDN 150, and the like.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for preventing blind signing attacks by configuring a policy-enforcing cosigner as a signer in a main multisignature (multisig) wallet, comprising:

selecting, by the policy-enforcing cosigner executed in the main multisig wallet, a blockchain transaction from a multisig transaction queue of the main multisig wallet;

processing, by a security engine connected to the policy-enforcing cosigner, the blockchain transaction through simulation and security validation to determine whether the blockchain transaction is valid, wherein the simulation comprises executing transaction logic in at least one of a sandbox execution environment and an emulator that replicates a target blockchain state, and generating predicted state changes resulting from the blockchain transaction, and further wherein the security validation comprises performing, by the security engine, at least one of static code analysis of call data associated with the blockchain transaction and dynamic analysis of simulated execution to detect a predefined threat condition;

signing, by the policy-enforcing cosigner, the blockchain transaction when the blockchain transaction is determined to be valid; and withholding a signature for the blockchain transaction when the blockchain transaction is determined to be invalid, wherein the policy-enforcing cosigner is configured as a required signer of the main multisig wallet, such that the blockchain transaction cannot be executed without a signature associated with the policy-enforcing cosigner.

2. The method of claim 1, further comprising:

providing, by the policy-enforcing consigner, a signature for the blockchain transaction after the signature was withheld, in response to approval by a user.

3. The method of claim 2, further comprising:

providing, by an independent signer operated under control of the policy-enforcing cosigner, the signature for the blockchain transaction only after the blockchain transaction has been simulated and security-validated by the security engine; and providing, by a dependent signer operated under the control of the policy-enforcing cosigner, the signature for the blockchain transaction only after the user approval.

4. The method of claim 3, further comprising:

configuring the policy-enforcing cosigner as a dedicated wallet in a 1-2 threshold configuration.

5. The method of claim 1, further comprising:

configuring the policy-enforcing cosigner to be addressed as a single signer on the blockchain in a signer set of the main multisig wallet.

6. The method of claim 5, further comprising:

providing, by an independent signer operated under control of the policy-enforcing cosigner, the signature for the blockchain transaction only after the blockchain transaction has been simulated and security-validated by the security engine; and providing, by a dependent signer operated under the control of the policy-enforcing cosigner, the signature for the blockchain transaction only after the user approval, wherein each of the independent signer and the dependent signer is on an isolated signing path associated with the single signer address of the policy-enforcing cosigner on the blockchain.

7. The method of claim 5, further comprising:

executing, by a multisig smart contract of the main multisig wallet, the blockchain transaction only upon validating satisfaction of a quorum threshold and a presence of the signature associated with the policy-enforcing cosigner.

8. The method of claim 1, further comprising:

cryptographically signing, by the security engine, at least one output of the simulation and the security validation; and storing the cryptographically signed output for audit and/or compliance review.

9. The method of claim 1, further comprising:

performing the simulation off-chain, wherein the off-chain simulation includes at least one of heuristic analysis, behavioral analysis, threat-intelligence testing, and validating the blockchain transaction against a set of rules.

10. The method of claim 1, further comprising:

performing both static code analysis of the call data and dynamic analysis of simulated execution to identify one or more threats including at least one of access-control failures, gas exhaustion, and arithmetic errors.

11. The method of claim 1, wherein the security validation comprises:

validating the blockchain transaction against a set of malicious websites maintained by the security engine.

12. The method of claim 1, wherein the main multisig wallet is any one of: a standard cryptocurrency wallet and a multi-party computation (MPC) cryptocurrency wallet.

13. A non-transitory computer-readable medium storing a set of instructions for preventing blind signing attacks by configuring a policy-enforcing cosigner as a signer in a main multisignature (multisig) wallet, the set of instructions comprising:

one or more instructions that, when executed by one or more processing circuitries of a device, cause the device to:

select, by the policy-enforcing cosigner executed in the main multisig wallet, a blockchain transaction from a multisig transaction queue of the main multisig wallet;

process, by a security engine connected to the policy-enforcing cosigner, the blockchain transaction through simulation and security validation to determine whether the blockchain transaction is valid, wherein the simulation comprises executing transaction logic in at least one of a sandbox execution environment and an emulator that replicates a target blockchain state, and generating predicted state changes resulting from the blockchain transaction, and further wherein the security validation comprises performing, by the security engine, at least one of static code analysis of call data associated with the blockchain transaction and dynamic analysis of simulated execution to detect a predefined threat condition;

sign, by the policy-enforcing cosigner, the blockchain transaction when the blockchain transaction is determined to be valid; and withhold a signature for the blockchain transaction when the blockchain transaction is determined to be invalid, wherein the policy-enforcing cosigner is configured as a required signer of the main multisig wallet, such that the blockchain transaction cannot be executed without a signature associated with the policy-enforcing cosigner.

14. A system for preventing blind signing attacks by configuring a policy-enforcing cosigner as a signer in a main multisignature (multisig) wallet comprising:

a processing circuitry;

a memory, the memory containing instructions that, when executed by the processing circuitry, configure the system to:

select, by the policy-enforcing cosigner executed in the main multisig wallet, a blockchain transaction from a multisig transaction queue of the main multisig wallet;

process, by a security engine connected to the policy-enforcing cosigner, the blockchain transaction through simulation and security validation to determine whether the blockchain transaction is valid, wherein the simulation comprises executing transaction logic in at least one of a sandbox execution environment and an emulator that replicates a target blockchain state, and generating predicted state changes resulting from the blockchain transaction, and further wherein the security validation comprises performing, by the security engine, at least one of static code analysis of call data associated with the blockchain transaction and dynamic analysis of simulated execution to detect a predefined threat condition;

sign, by the policy-enforcing cosigner, the blockchain transaction when the blockchain transaction is determined to be valid; and withhold a signature for the blockchain transaction when the blockchain transaction is determined to be invalid, wherein the policy-enforcing cosigner is configured as a required signer of the main multisig wallet, such that the blockchain transaction cannot be executed without a signature associated with the policy-enforcing cosigner.

15. The system of claim 14, wherein the memory contains further instructions which when executed by the processing circuitry further configure the system to:

provide, by the policy-enforcing consigner, a signature for the blockchain transaction after the signature was withheld, in response to approval by a user.

16. The system of claim 15, wherein the memory contains further instructions which when executed by the processing circuitry further configure the system to:

provide, by an independent signer operated under control of the policy-enforcing cosigner, the signature for the blockchain transaction only after the blockchain transaction has been simulated and security-validated by the security engine; and provide, by a dependent signer operated under the control of the policy-enforcing cosigner, the signature for the blockchain transaction only after the user approval.

17. The system of claim 16, wherein the memory contains further instructions which when executed by the processing circuitry further configure the system to:

configure the policy-enforcing cosigner as a dedicated wallet in a 1-2 threshold configuration.

18. The system of claim 14, wherein the memory contains further instructions which when executed by the processing circuitry further configure the system to:

configure the policy-enforcing cosigner to be addressed as a single signer on the blockchain in a signer set of the main multisig wallet.

19. The system of claim 18, wherein the memory contains further instructions which when executed by the processing circuitry further configure the system to:

provide, by an independent signer operated under control of the policy-enforcing cosigner, the signature for the blockchain transaction only after the blockchain transaction has been simulated and security-validated by the security engine; and provide, by a dependent signer operated under the control of the policy-enforcing cosigner, the signature for the blockchain transaction only after the user approval, wherein each of the independent signer and the dependent signer is on an isolated signing path associated with the single signer address of the policy-enforcing cosigner on the blockchain.

20. The system of claim 18, wherein the memory contains further instructions which when executed by the processing circuitry further configure the system to:

execute, by a multisig smart contract of the main multisig wallet, the blockchain transaction only upon validating satisfaction of a quorum threshold and a presence of the signature associated with the policy-enforcing cosigner.

21. The system of claim 14, wherein the memory contains further instructions which when executed by the processing circuitry further configure the system to:

cryptographically sign, by the security engine, at least one output of the simulation and the security validation; and store the cryptographically signed output for audit and/or compliance review.

22. The system of claim 14, wherein the memory contains further instructions which when executed by the processing circuitry further configure the system to:

perform the simulation off-chain, wherein the off-chain simulation includes at least one of heuristic analysis, behavioral analysis, threat-intelligence testing, and validating the blockchain transaction against a set of rules.

23. The system of claim 14, wherein the memory contains further instructions which when executed by the processing circuitry further configure the system to:

perform both static code analysis of the call data and dynamic analysis of simulated execution to identify one or more threats including at least one of access-control failures, gas exhaustion, and arithmetic errors.

24. The system of claim 14, wherein the security validation comprises:

validate the blockchain transaction against a set of malicious websites maintained by the security engine.

25. The system of claim 14, wherein the main multisig wallet is any one of:

a standard cryptocurrency wallet and a multi-party computation (MPC) cryptocurrency wallet.

* * * * *